Sept. 22, 1931.   F. G. HODELL   1,824,546
CONNECTING MEANS FOR CHAINS
Filed May 23, 1930

INVENTOR
Frederick G. Hodell
BY
Brockett, Hyde, Higley & Meyer
ATTORNEYS

Patented Sept. 22, 1931

1,824,546

UNITED STATES PATENT OFFICE

FREDERICK G. HODELL, OF CLEVELAND HEIGHTS, OHIO, ASSIGNOR TO THE CHAIN PRODUCTS COMPANY, OF CLEVELAND, OHIO, A CORPORATION OF OHIO

CONNECTING MEANS FOR CHAINS

Application filed May 23, 1930. Serial No. 454,986.

My invention relates to means for securing the free ends of a length of chain together and, particularly, to a connecting means adapted for use in securing the free ends of the side chains of anti-skid tire devices together.

Generally, anti-skid tire devices of the type to which this invention relates have consisted of two relatively long lengths of chain adapted to extend around approximately the circumference of the rim of a wheel and commonly referred to as side chains, and short transverse members of a length sufficient to extend laterally around the tire from one side thereof to the other and connect the longitudinal side chains together, the transverse members being disposed at spaced intervals around the circumference of the wheel. One end of each of the longitudinal side chains has ordinarily been provided with a connecting means or locking link whereby after placing the anti-skid device in proper position on the tire, the whole could be secured thereon by employing the connecting means or side chain lock to secure the free ends of each side chain together.

The principal objects of this invention are to produce a connecting means for the free ends of the longitudinal side chains of such nature that the ends of the side chains may be brought into the desired position with ease or may be released from such position with the same ease; to provide a connecting means or side chain lock that is simple in construction and inexpensive to manufacture; and to provide a connecting means or side chain lock that is secure against inadvertent or unintended unlocking.

Figure 1:
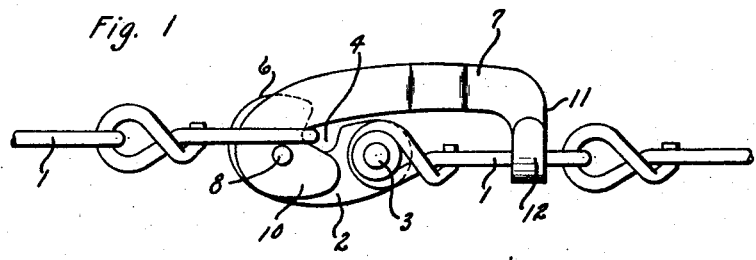
Figure 2:
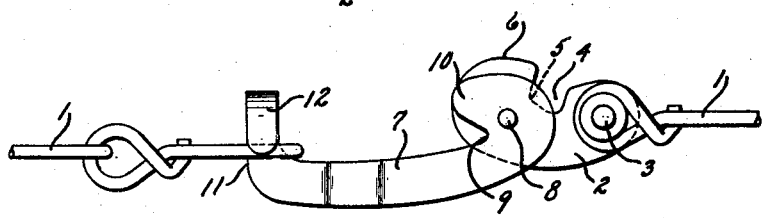
Figure 3:
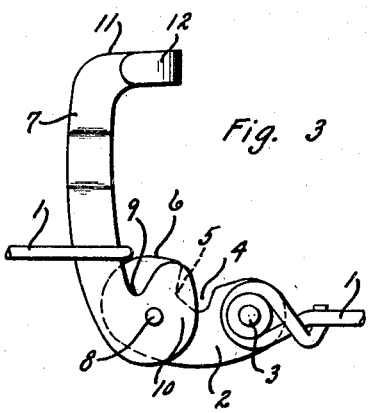
Figure 4:
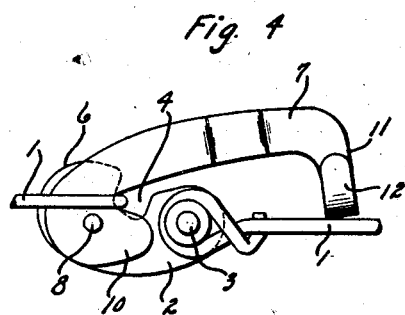
Figure 5:
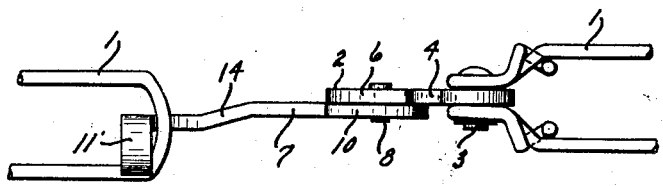
Figure 6:
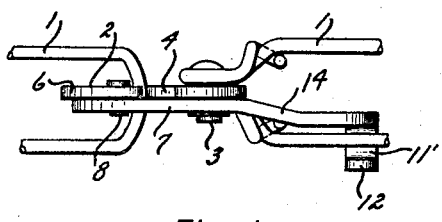

Various other objects and advantageous features of my invention may be seen in the following detailed description and one embodiment thereof may be seen in the accompanying drawings wherein similar characters of reference designate corresponding parts and wherein Fig. 1 is a side elevation showing one embodiment of my invention in locked position; Fig. 2 is a view similar to Fig. 1 but showing the device in open position; Fig. 3 is a view showing the device in partially closed position; Fig. 4 is a view showing the device in still another closed position; Fig. 5 is a top plan view of the device as shown in Fig. 2; and Fig. 6 is a top plan view of the device as shown in Fig. 1.

Referring to the drawings, each of the side chain links 1, a plurality of which go to make up a length of chain which constitutes one of the side chains of an anti-skid tire device, are of the type generally found in anti-skid chains and are formed symmetrically. That is, each link is formed of a length of spring wire that is bent to form an eye as shown, the free ends of the wire being also bent around the body portion of the length of wire to form adjacent aligned eyes at one end of the link. Such chain is well known in the art.

In accordance with my invention, the adjacent aligned eyes of one of the links 1 are secured to one end of a member 2 which forms the tension member of the connecting means or side chain lock by means of a headed pin 3 extending through the member 2 and swaged at its headless end over a washer as shown. Thus, the tension member 2 is permanently secured to the end link 1 of the chain but in such manner that there may be free relative rotative and a certain degree of twisting movement between the link and the tension member.

As shown in the drawings, the tension member 2 is provided with a notch 4 that is slightly undercut as at 5 in a direction away from the pivotal connection between the link 1 and the tension member 2 just described. The tension member 2 is also provided with an arcuate surface 6 that extends slightly downwardly to the upper edge of the notch 4.

A locking lever 7 is pivotally connected to the tension member 2 as at 8, such pivotal connection being slightly to the rear of and below the notch 4 and substantially in the same plane as the pivotal connection between the link 1 and the tension member 2. Such locking lever is provided with a notch 9 and its shape substantially conforms to the shape of the end of the tension member 2 to which it is pivotally connected. Thus, the locking lever takes the form of a hook shaped member having one upstanding end 10.

The free end of the locking lever 7 extends outwardly as at 11, laterally as at 11' and then inwardly as at 12, to form a U-shaped hook member which, as shown in Figs. 1 and 6, is adapted to engage one of the sides of the link 1 when the connecting means or side chain lock is in locked position and thereby prevent release of such lock and its connection with the free ends of a side chain to which it is applied. As shown, the locking lever extends angularly laterally for a portion of its length as at 14 whereby the U-shaped hook member may engage one of the sides of the link 1 while a length of the main body portion of the locking lever is parallel to the tension member 2.

In the operation of this device, the tension member 2 being secured to one of the end links of a length of chain as hereinbefore described, the end link of the opposing free end of the chain is placed over the U-shaped hook member of the locking lever 7 as shown in Fig. 2. Then, the locking lever is rotated about its pivotal connection with the tension member 2, the end link disposed thereon riding over the arcuate surface 6 of the tension member and down into the undercut notch 4 in the tension member and the notch 9 in the locking lever as clearly shown in Fig. 4. At this time, the locking lever may be further moved about its pivotal connection with the tension member until the U-shaped hook member on the locking lever engages the side of a link 1 in the manner shown in Figs. 1 and 6, whereby the ends of the chain will be securely locked together.

Referring to the drawings and the preceding description, it will be seen that I have provided a device of the type described embodying numerous novel and advantageous features. For instance, I have provided a device wherein drawing the free ends of a chain together is a relatively simple and easy matter due to the position of the pivotal connection between the locking lever and the tension member and the shape of one side of the tension member which takes the form of an arcuate surface. The pivotal connection between the locking lever 7 and the tension member 2 is so disposed as to give a maximum leverage to the locking lever for pulling the links that form the opposing free ends of each side chain toward each other.

Another advantageous feature resides in the fact that the undercut notch 4 and the notch 9 in the locking lever 7 so cooperate when in operative position with a link disposed in the undercut notch 4 that there will be no longitudinal pull on the locking lever but all pull or tension will be exerted on the tension member 2. In fact, the locking lever when in closed but unlatched position, in itself tends to retain the link in the undercut notch 4. Thus there is little if any, likelihood of the chain link becoming disengaged from the connecting means irrespective of whether or not the locking lever is latched or unlatched. A further advantageous feature resides in the fact that the locking lever 7 is so positioned and formed relative to the tension member 2 that movement of the lever to the position shown in Fig. 2 will automatically push the chain link out of engagement with the undercut notch 4 of the tension member. Various other novel and advantageous features will be readily apparent.

What I claim is:

1. A device of the character described comprising a tension member pivotally connected to one of the links of a chain, a locking lever pivotally connected to said tension member and adapted to extend along said tension member when in closed position, both of said pivots being in substantially the same plane, said tension member having an undercut notch therein for the reception of a chain link, and said locking lever having a notch therein that is coincident with the undercut notch in said tension member when the connecting means is in substantially closed position, said locking lever being adapted to move the chain link both into and out of the undercut notch in said tension member, and having means on one end thereof for engaging a link in the chain to maintain the connecting means in closed position.

2. A device of the character described comprising a tension member having a pivotal connection with the link of a chain and an undercut notch therein for the reception of another chain link, and an arcuate surface leading to the upper edge of said notch, a locking lever pivotally connected to said tension member, the pivots between said locking lever and said tension member and between said tension member and said chain link being in substantially the same plane, said locking lever being adapted to extend along said tension member and having a notch therein that is coincident with the undercut notch in said tension member when the connecting means is in substantially closed position, being adapted to move a chain link both into and out of the undercut notch in said tension member and having means on one end thereof adapted to engage one of the links of the chain to hold the connecting means in substantially closed position, the locking lever and tension member being of such nature that no longitudinal stress or tension will be placed upon the locking lever by a chain link disposed in the undercut notch therein.

In testimony whereof I hereby affix my signature.

FREDERICK G. HODELL.